UNITED STATES PATENT OFFICE.

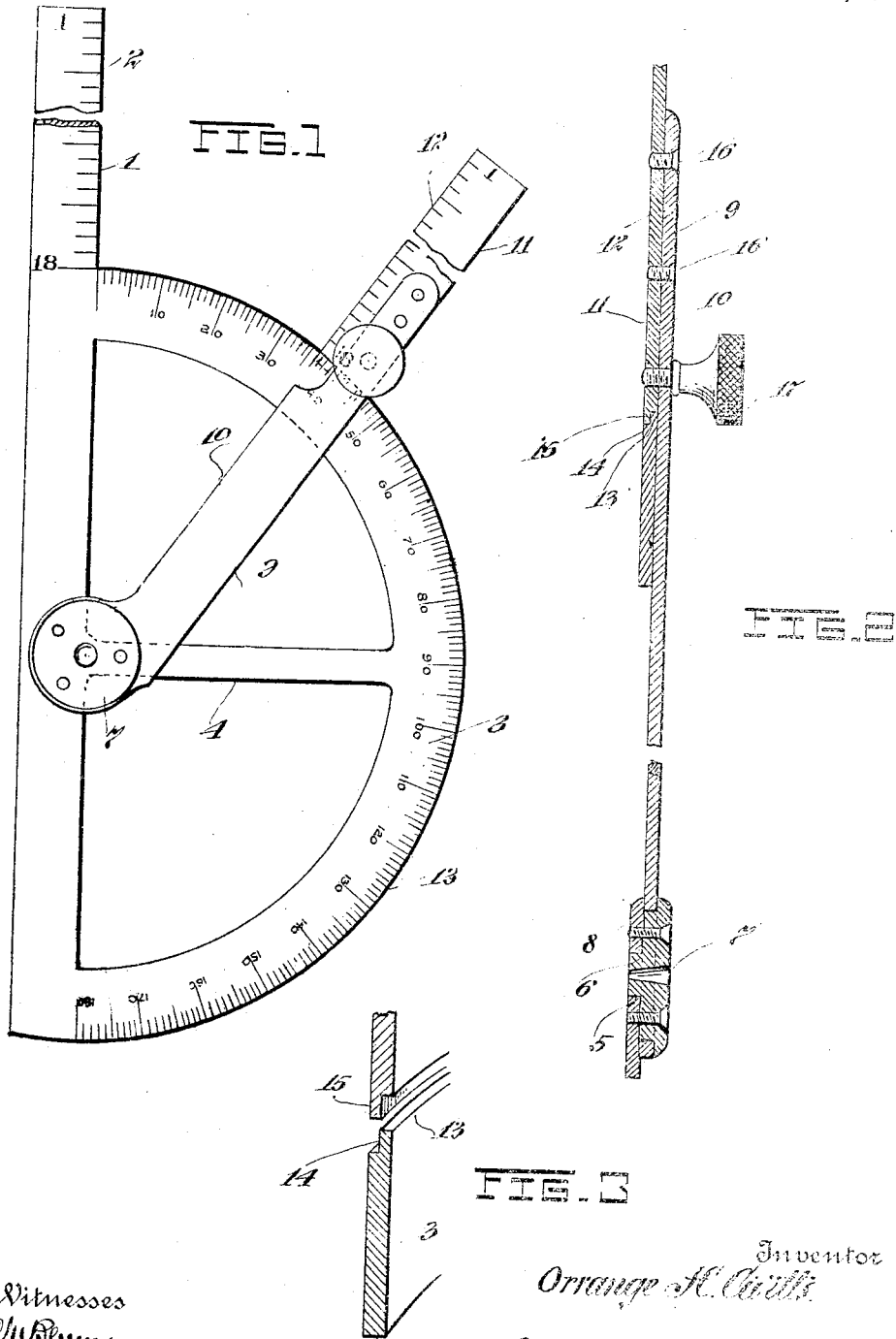

ORRANGE H. CIVITTS, OF PITTSBURGH, PENNSYLVANIA.

MEASURING INSTRUMENT.

1,331,415. Specification of Letters Patent. Patented Feb. 17, 1920.

Application filed October 15, 1918. Serial No. 258,143.

*To all whom it may concern:*

Be it known that I, ORRANGE H. CIVITTS, a citizen of the United States, residing at Pittsburgh, in the county of Allegheny and State of Pennsylvania, have invented new and useful Improvements in Measuring Instruments, of which the following is a specification.

This invention relates to a measuring instrument and more particularly to an improvement over the instrument disclosed in my United States Patent 1,277,860, dated September 3, 1918, by means of which the exact angular relation that one line bears to another may be readily determined.

The primary object of the invention is to provide a more simple and inexpensive construction for accomplishing the foregoing result.

An object of the invention is the manner of constructing and associating the different parts so that distortion of parts will be prevented and accurate operation of the device assured.

With these and other objects in view the invention will be better understood from the following detailed description taken in connection with the accompanying drawing wherein:

Figure 1 is a plan view of the scale with a portion of the limb broken away.

Fig. 2 is an enlarged sectional view.

Fig. 3 is a perspective view of a portion of the device showing the rib of the movable limb about to be arranged in the groove of the arcuate scale.

The invention in one of its forms consists of a stationary limb 1 having scale marks 2 and formed integral with an arcuate scale or protractor 3. This protractor 3 has an intermediate portion connected to the limb 1 by a bridge piece 4 thus increasing the strength of the protractor 3. At the center of curvature of member 3 the limb 1 is provided with an opening 5 receiving the reduced portion 6 of a plate 7 that is secured to the limb 1 by screws 8. The numeral 9 designates a movable arm having one end mounted upon the reduced portion 6 of the plate 7 so as to swing in an arc. This arm 9 consists of two members 10 and 11, the latter being in the form of a straight edge plate provided with scale marks 12.

Referring more particularly to Figs. 2 and 3 it will be noted that the outer peripheral portion of the protractor 3 is provided with a continuous arcuate groove 14 forming a flange 13, the groove receiving the correspondingly shaped flange 15 on the member 11. By this arrangement it will be seen that the arm 9 has an arcuate bearing upon the protractor 3 while the proper movement of the arm 9 with relation to the protractor 3 is assured. The members 10 and 11 are connected together as indicated at 16 by a thumb screw 17 passing through the member 10 and screw threaded in the plate 11 adjacent the rib 15 with the advantage that when the screw 17 is tightened the outer edge of the protractor 3 will be clamped between the rib 15 and the member 10 for rigidly holding the arm 9 in any of its adjusted positions.

From the foregoing description taken in connection with the accompanying drawing it should be apparent that I provide an instrument of simple substantial construction which may be manufactured at a relatively low cost without sacrificing accuracy thereof.

Having described my invention, what I claim is:

1. In an instrument of the character described, a protractor, a member pivotally secured to said protractor centrally thereof and extending beyond the same, and a member rigidly secured to the outer portion of said pivotally secured member and having its inner end positioned closely adjacent the outer edge of said protractor, said rigidly secured member having one edge disposed radially of the protractor.

2. In an instrument of the character described, a protractor, an arm pivotally secured to said protractor centrally thereof so as to be movable over the same, said arm extending beyond the periphery of the protractor, a straight edge plate secured on the outer portion of the arm with one edge disposed radially of the protractor and having its inner end closely adjacent the edge of said protractor, said plate being provided with an element extending across the opposite face of the protractor from the arm, and means for forcing the plate and arm toward each other into binding contact with said protractor.

3. In an instrument of the character described, a protractor, an arm pivoted to said protractor centrally thereof and extending radially of the protractor across one face of the same, said arm projecting beyond the protractor, a straight edge plate secured on the outer portion of said arm with its inner end adjacent the edge of the protractor, said protractor and the inner end portion of the plate being provided respectively with an interfitting flange and rabbet, and means for forcing said plate and the arm toward each other into binding contact with the flange of the protractor.

In testimony whereof I affix my signature.

ORRANGE H. CIVITTS.